(12) United States Patent
Abbate

(10) Patent No.: US 9,344,869 B2
(45) Date of Patent: May 17, 2016

(54) METHOD AND APPARATUS FOR ENHANCED NAVIGATION IN A DISPATCH COMMUNICATION SYSTEM

(71) Applicant: Motorola Solutions, Inc., Schaumburg, IL (US)

(72) Inventor: Alain A. Abbate, Coral Springs, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 271 days.

(21) Appl. No.: 13/765,188

(22) Filed: Feb. 12, 2013

(65) Prior Publication Data

US 2014/0226532 A1   Aug. 14, 2014

(51) Int. Cl.
| | |
|---|---|
| H04L 5/14 | (2006.01) |
| H04B 7/00 | (2006.01) |
| H04J 3/16 | (2006.01) |
| H04W 4/22 | (2009.01) |
| H04M 3/56 | (2006.01) |
| H04L 29/06 | (2006.01) |

(52) U.S. Cl.
CPC ........... *H04W 4/22* (2013.01); *H04L 29/06414* (2013.01); *H04M 3/561* (2013.01); *H04M 3/567* (2013.01)

(58) Field of Classification Search
CPC ...................................................... H04W 4/22
USPC ......................................................... 370/259
See application file for complete search history.

(56) References Cited

U.S. PATENT DOCUMENTS

| | | | |
|---|---|---|---|
| 5,410,486 A | 4/1995 | Kishi et al. | |
| 5,613,201 A * | 3/1997 | Alford | H04W 84/08 455/18 |
| 6,172,641 B1 | 1/2001 | Millington | |
| 6,738,742 B2 | 5/2004 | Badt et al. | |
| 7,224,962 B1 * | 5/2007 | Kite | H04M 1/65 455/412.1 |
| 8,275,307 B2 | 9/2012 | Doyle, III | |
| 8,275,348 B2 | 9/2012 | Yen et al. | |
| 2004/0029558 A1* | 2/2004 | Liu | G01S 5/02 455/404.2 |
| 2005/0001720 A1* | 1/2005 | Mason et al. | 340/539.13 |
| 2005/0083195 A1* | 4/2005 | Pham | G08B 15/001 340/539.13 |

(Continued)

FOREIGN PATENT DOCUMENTS

| | | |
|---|---|---|
| DE | 19728470 A1 | 1/1999 |
| EP | 1254349 A1 | 11/2002 |

(Continued)

OTHER PUBLICATIONS

Setting Navigation preferences—VZ Navigator—Blackberry, accessed at http://support.verizonwireless.com/clc/devices/knowledge_base.html?id=25020, accessed on Jul. 10, 2013, pp. 11.

*Primary Examiner* — Faruk Hamza
*Assistant Examiner* — Abu-Sayeed Haque
(74) *Attorney, Agent, or Firm* — Daniel R. Bestor

(57) ABSTRACT

A method and apparatus provide enhanced navigational alerts for a vehicular two-way radio operating in a dispatch communication system. The integration and prioritization of navigational alerts with dispatch voice communication ensures that navigational alerts do not compromise mission critical voice communications. Navigational alerts in the form of navigational voice instructions and navigational tones are selectively prioritized based on predetermined parameters associated with the dispatch call.

17 Claims, 2 Drawing Sheets

(56) References Cited

U.S. PATENT DOCUMENTS

| | | | |
|---|---|---|---|
| 2006/0194566 A1* | 8/2006 | Oesterling | H04M 11/04 455/404.1 |
| 2007/0112504 A1* | 5/2007 | Krause | G01C 21/3407 701/532 |
| 2009/0233572 A1* | 9/2009 | Basir | H04M 3/5116 455/404.1 |
| 2009/0248420 A1* | 10/2009 | Basir | H04M 1/6075 704/275 |
| 2010/0048184 A1 | 2/2010 | Kim | |
| 2011/0098056 A1 | 4/2011 | Rhoads et al. | |
| 2011/0153209 A1 | 6/2011 | Geelen | |
| 2011/0225238 A1* | 9/2011 | Shaffer | H04L 63/08 709/204 |
| 2014/0002241 A1* | 1/2014 | Elghazzawi | H04W 76/007 340/8.1 |

FOREIGN PATENT DOCUMENTS

| | | |
|---|---|---|
| EP | 0836074 B1 | 3/2004 |
| EP | 2013577 A2 | 1/2009 |
| WO | 0146650 A1 | 6/2001 |
| WO | 2007101700 A2 | 9/2007 |

\* cited by examiner

METHOD AND APPARATUS FOR ENHANCED NAVIGATION IN A DISPATCH COMMUNICATION SYSTEM

FIELD OF THE INVENTION

The present invention relates generally to dispatch communication systems and more particularly to navigational instructions utilized within vehicular dispatch communication systems.

BACKGROUND

As two-way radio communication devices continue to evolve, the addition of numerous features has also expanded. The ability to operate numerous features within a vehicular environment in a hands-free manner is considered desirable, particularly in the public safety communications environment.

Navigational systems are utilized within vehicles to provide driving directions, typically through the use of a display showing a map and showing turn instructions. Stand-alone, hands-free, navigation systems assume that the driver is focused on driving and that following navigation instructions will be the driver's top priority. However, within the public safety environment, users of dispatch radios are often multiplexing amongst a variety of tasks in addition to driving. For a police officer, dispatch voice communication is of critical importance, and the ability to avoid conflicts with such calls is imperative.

Accordingly, it would be desirable to provide an enhanced dispatch communication system having navigational features which avoid conflict with a dispatch call.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
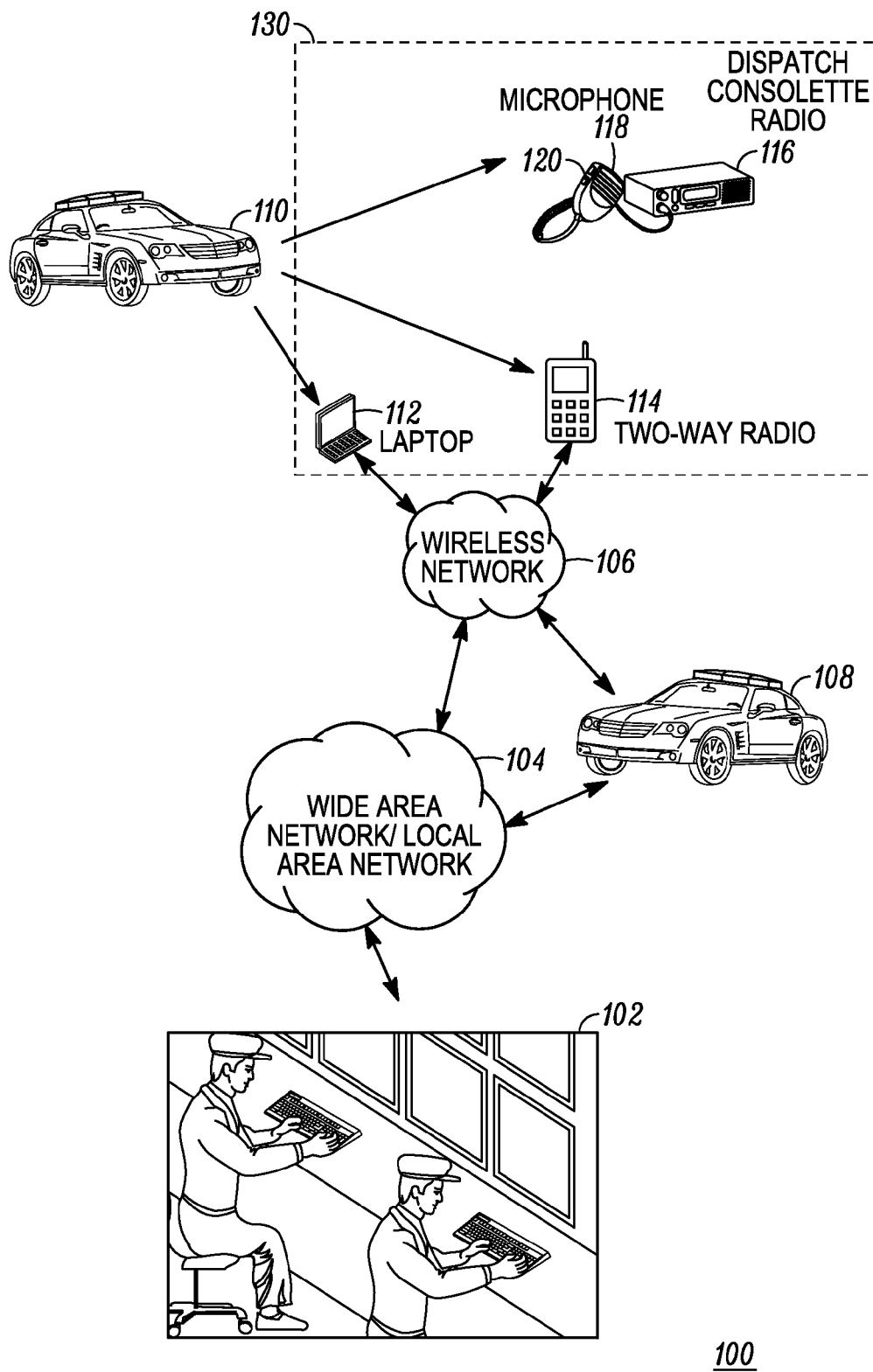
FIG. 1 is a communication system having a vehicular two-way radio and dispatch center radio operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in method steps and apparatus components for a vehicular two-way radio to generate and control navigational instructions which avoid conflict with dispatch voice communication. It is important to appreciate that dispatch radio applications differ from those of consumer type devices, such as smart phones or cellular phones. The dispatch radio provides half-duplex (also referred to as simplex) audio communication in which one party transmits via a push of a push-to-talk (PTT) button and the other party receives, and then the other party transmits and the first party receives. Full duplex devices, on the other hand, allow both parties to transmit and receive audio at the same time. Users of dispatch radios are often multiplexing amongst a variety of tasks and the distraction of combining dispatch voice and navigation voice creates a conflict as neither can be clearly understood. While smart phones/cellular phones may attempt to resolve audio conflicts when they occur, they do not actually prevent audio conflicts from occurring. The vehicular two-way radio provided herein avoids such a conflict by generating navigational alerts which comprise voice navigational instructions and navigational tones which are selectively transmitted by the two-way radio based on the occurrence of the dispatch call and parameters associated with the dispatch call. The method and apparatus integrate and prioritize navigational alerts with dispatch voice communication to ensure that navigational alerts do not compromise mission critical voice communications.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with location sensing circuits and certain non-processor circuits, some, most, or all of the functions of a location sensing system and method of storing and sharing location information described herein. The non-processor circuits may include, but are not limited to, a radio receiver, a radio transmitter, signal drivers, clock circuits, power source circuits, and user input devices. As such, these functions may be interpreted as steps of a method to perform sharing of device location details. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a schematic diagram of a communication system 100, formed and operating in accordance with the various embodiments. Communication system 100 comprises a dispatch radio center 102 communicating over networks 104, 106 with dispatch radio vehicles 108, 110. The networks 104, 106 may comprise, for example, a wide area network/local area network 104 and wireless network 106. Each dispatch radio vehicle 108, 110 comprises a dispatch radio, such as vehicular two-way radio 116. The vehicular two-way radio 116 may be, a handheld radio mounted to a vehicular adapter, or a dispatch console radio having a remote microphone 118 with push-to-talk (PTT) button 120. Additional devices such as a laptop 112 and a portable data device 114 may also be located in the vehicle forming a plurality of communication devices 130 under the control of the driver.

Dispatch radio 116 operates in accordance with the various embodiments, wherein navigational alerts comprising navigational tones and navigational voice instructions are selectively prioritized based on the dispatch communications taking place. The navigational alerts comprising navigational tones and navigational voice instructions are selectively prioritized by the vehicular two-way radio 116. The dispatch call scenarios may include the vehicular two-way radio 116 engaging in a dispatch call with dispatch radio center 102, or the vehicular two-way radio 116 listening to dispatch calls being made others, such as listening to a dispatch call being made between dispatch radio vehicle 110 and dispatch radio center 102. In accordance with the various embodiments, the navigational alerts may be rendered during audio transmissions of the dispatch call, and both navigational tones and navigational voice instructions may be simultaneously rendered when the dispatch call has ended. Thus, conflicts with the dispatch call have been avoided.

In cases where the vehicular two-way radio 116 monitors dispatch calls between other vehicular two-way radios, the dispatch radio may automatically prioritize the selection of navigational tones and navigational voice instructions based on predetermined dispatch call parameters. The predetermined dispatch call parameters may comprise at least one of: criticality level of the dispatch call, user ID associated with the dispatch call, and/or the amount of time required for executing a navigational maneuver by the vehicle.

In cases where the dispatch radio center 102 is engaged in a dispatch call with the vehicular two-way radio 116, the navigational alerts comprising navigational tones are prioritized during the dispatch call, the navigational alerts comprising the combination of voice navigational instructions and navigational tones may be prioritized in between dispatch calls. The use of the combination of navigational tones and navigational voice instructions allows the driver to learn and become accustomed to the meaning of the tones. For example, three short tones rising in pitch might indicate an upcoming left turn. The combinational use of tones and voice negates any requirement for a visual display which would be a distraction to the driver.

In both listening and talking use cases, if the dispatch call is determined to fall below a predetermined level of importance, then navigational voice instructions in conjunction with navigational tones may be utilized. This is not perceived as a conflict in that the system can automatically switch back to a tone-only mode if the level of importance of the call being listened to changes. The level of importance of a call may be determined by caller ID, call codes (e.g. police codes), and call duration vs. amount of time needed for the vehicle to complete a navigation maneuver. For example, high or low priority could be assigned to calls containing the following Official Ten-Code List from the Association of Public Communications Officers (APCO):

10-0 Caution
10-1 Unable to copy—change location
10-2 Signal good
10-3 Stop transmitting
10-4 Acknowledgement (OK)
10-5 Relay
10-6 Busy—stand by unless urgent
10-7 Out of service
10-8 In service
10-9 Repeat
10-10 Fight in progress
10-11 Dog case
10-12 Stand by (stop)
10-13 Weather—road report
10-14 Prowler report
10-15 Civil disturbance
10-16 Domestic disturbance
10-17 Meet complainant
10-18 Quickly
10-19 Return to . . .
10-20 Location
10-21 Call . . . by telephone
10-22 Disregard
10-23 Arrived at scene
10-24 Assignment completed
10-25 Report in person (meet) . . .
10-26 Detaining subject, expedite
10-27 Drivers license information
10-28 Vehicle registration information
10-29 Check for wanted
10-30 Unnecessary use of radio
10-31 Crime in progress
10-32 Man with gun
10-33 Emergency
10-34 Riot
10-35 Major crime alert
10-36 Correct time
10-37 (Investigate) suspicious vehicle
10-38 Stopping suspicious vehicle
10-39 Urgent—use light, siren
10-40 Silent run—no light, siren
10-41 Beginning tour of duty
10-42 Ending tour of duty
10-43 Information
10-44 Permission to leave . . . for . . .
10-45 Animal carcass at . . .
10-46 Assist motorist
10-47 Emergency road repairs at . . .
10-48 Traffic standard repair at . . .
10-49 Traffic light out at . . .
10-50 Accident (fatal, personal injury, property damage)
10-51 Wrecker needed
10-52 Ambulance needed
10-53 Road blocked at . . .
10-54 Livestock on highway
10-55 Suspected DUI
10-56 Intoxicated pedestrian
10-57 Hit and run (fatal, personal injury, property damage)
10-58 Direct traffic
10-59 Convoy or escort
10-60 Squad in vicinity
10-61 Isolate self for message 10-62 Reply to message
10-63 Prepare to make written copy
10-64 Message for local delivery
10-65 Net message assignment
10-66 Message cancellation
10-67 Clear for net message
10-68 Dispatch information
10-69 Message received
10-70 Fire
10-71 Advise nature of fire
10-72 Report progress on fire
10-73 Smoke report
10-74 Negative
10-75 In contact with . . .
10-76 En route . . .
10-77 ETA (estimated time of arrival)
10-78 Need assistance
10-79 Notify coroner
10-80 Chase in progress
10-81 Breathalyzer
10-82 Reserve lodging
10-83 Work school xing at . . .
10-84 If meeting . . . advise ETA
10-85 Delayed due to . . .
10-86 Officer/operator on duty
10-87 Pick up/distribute checks
10-88 Present telephone number of . . .
10-89 Bomb threat
10-90 Bank alarm at . . .
10-91 Pick up prisoner/subject
10-92 Improperly parked vehicle
10-93 Blockade
10-94 Drag racing
10-95 Prisoner/subject in custody
10-96 Mental subject
10-97 Check (test) signal
10-98 Prison/jail break
10-99 Wanted/stolen indicated For example, preprogrammed high priority could be assigned to codes such as 10-32 Man with gun, 10-33 Emergency, 10-34 Riot, and 10-35 Major crime alert to ensure that only navigational tone alerts are used, while codes such as 10-45 Animal carcass at location x and 10-36 Correct time could be communicated in parallel with navigational tone alerts and navigational voice instructions. If the level of priority of the dispatch call changes, then the navigational alerts can change accordingly based on that priority.

Calls may be take place between dispatchers or from other officers operating within the system. As such, priority based on calling ID provides yet another parameter for prioritizing a dispatch call. For example, an ID associated with a Police Chief could be prioritized over a caller ID of a subordinate. In accordance with the various embodiments, the navigational alerts comprising navigational tones or the combination of navigational tones and navigational voice instructions may be selectively prioritized based on calling ID.

Another case which can be used to prioritize calls is use of "scanning". In this case, an officer sets their radio to a primary talk group (a.k.a. channel), but the radio also scans other talk groups (channels). For example, a police officer could set his/her radio to listen to the police dispatcher as primary talk group, but also scan calls from the fire department and from police dispatchers in adjacent towns. When simultaneous conversations take place on multiple channels, the radio must choose which conversation to listen to. Scanned calls are of lower priority than non-scanned primary calls. The scanned channels can also be given different relative priorities. In accordance with the various embodiments, the navigational alerts comprising navigational tones or the combination of navigational tones and navigational voice instructions may be selectively prioritized based on the scan priorities.

Yet another case involving priorities pertains to emergency calls. Typically, a police radio has a dedicated orange emergency button. If an officer presses the emergency button and then presses PTT, the resulting emergency call is given the highest priority. So for some operational cases, it may be desirable to suppress both navigational voice and navigational tone instructions during an emergency call.

In accordance with the various embodiments, prioritization of the navigational alerts themselves can be integrated within the system. For example, a low priority voice navigational instruction such as "continue straight on Archer road" and the tone associated therewith could be postponed or eliminated during calls of a predetermined priority. Turn instructions would be given a higher priority, thus rendering the navigational alert(s) than non-turn/non-change type instructions.

Hence, the vehicular two-way radio's 116 ability to monitor a dispatch call and automatically select navigational tones (or combination of navigational tones and navigational voice instructions) based on a predetermined prioritization of the dispatch call enhances the calling environment.

Figure 2:
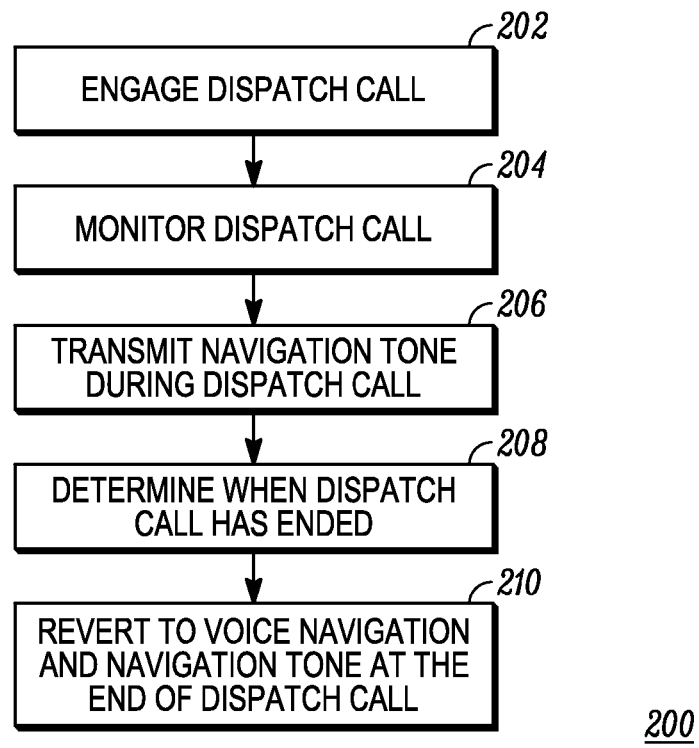
FIG. 2 is a flowchart of a method for providing navigational instructions within the communication system of FIG. 1 in accordance with the various embodiments.

FIG. 2 is a method for providing navigational instructions at a vehicular two-way radio, such as dispatch radio 116 in a dispatch communication in accordance with the various embodiments. Beginning at 202, the dispatch radio either engages in a dispatch call with a dispatch radio center or listens to a dispatch call occurring between other users of the system. The dispatch radio monitors the dispatch call at 204. Based on the monitoring at 204, a navigational tone is transmitted during the dispatch call which indicates driving directions to the driver. A determination that the dispatch call has ended takes place at 208. Once the dispatch call has ended at 208, the navigational instructions revert back to rendering both a voice navigational instruction and a navigational tone at 210.

In accordance with the various embodiments, the vehicular two-way radio automatically selects between the voice navigational instruction and the navigational tone, and the selection may be made made based on predetermined parameters associated with the dispatch call. For example, referring back to 204, the dispatch call may be monitored for one of a plurality of dispatch call parameters. Monitoring the dispatch call may comprise monitoring the dispatch call to determine a criticality level of the dispatch call and/or to determine whether the dispatch call exceeds a predetermined time and/or to determine a calling ID of the participants in the dispatch call. Determining the calling IDs may comprise determining the calling ID of a dispatcher of the dispatched call when the dispatch call takes place between the vehicular two-way radio and the dispatcher. Alternatively, when listening to a dispatch call taking place between other two-way radios, then determining calling IDs may comprise determining the calling IDs of those other two-way radio participants. Scan priority and emergency status may also be parameters that can be monitored.

Hence, in accordance with the various embodiments, monitoring the dispatch call at 204 may be based on, for example: the dispatch call exceeding a predetermined time (e.g. to complete a maneuver), criticality level of the dispatch call, calling ID of participants, emergency status of the call; and/or scan priority.

In accordance with the various embodiments, the step of monitoring may further comprise monitoring the dispatch call for a predetermined level of importance, transmitting the navigational tone during the dispatch call when the dispatch call meets the predetermined level of importance, and transmitting navigational voice instructions and navigational alerts during the dispatch call when the dispatch call does not meet the predetermined level of importance. For example calling codes may be used to determine the level of importance of a call.

In accordance with the various embodiments, the automatic selection of navigational tones and navigational voice instructions may further comprise postponing rendering any navigational alerts when a dispatch call is in progress, and rendering the navigational tone while the dispatch call is in progress when a time threshold has been reached at which a navigation maneuver is required. This postponing and automatic rendering based on a time threshold ensures that the navigational alerts are provided with sufficient time for the vehicle to make the required maneuver.

In accordance with the various embodiments, rendering navigational alerts in the form of both navigational tones and navigational voice instructions may be selectively controlled to occur between audio transmissions of a dispatch call. In other words if the dispatch call has not ended but the length of time between audio transmissions is sufficient, then both navigational tones and navigational voice instructions may be desirable.

All of the various embodiments allow for the navigational alerts comprising navigational tones and navigational voice instructions to be automatically selectively prioritized by the vehicular two-way radio so as to avoid or minimize conflict with a dispatch call.

Figure 3:
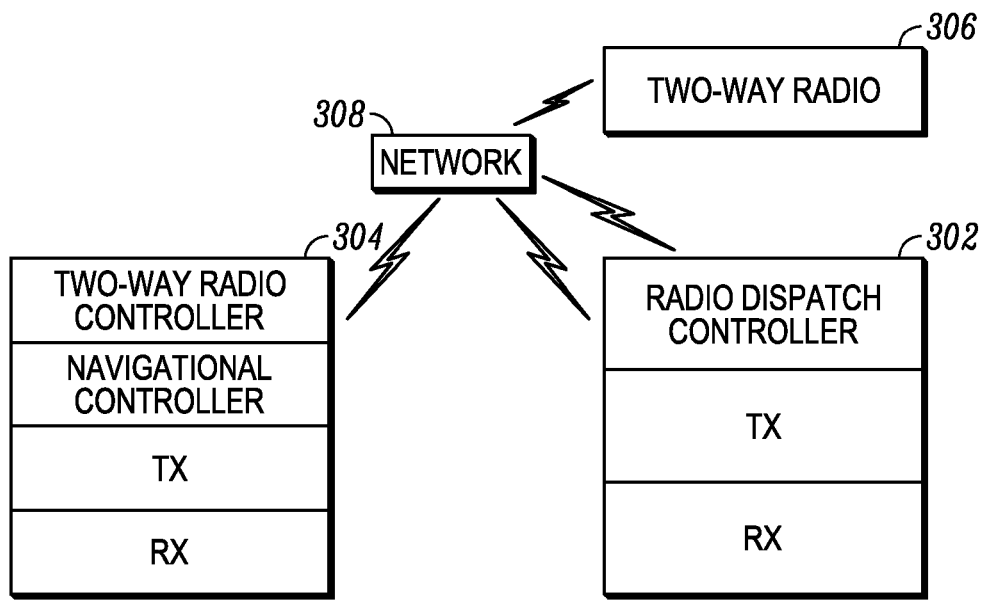
FIG. 3 is a block diagram of a vehicular two-way radio and dispatch center radio operating in accordance with the various embodiments.

FIG. 3 is a block diagram of a communication system 300 comprising a vehicular two-way radio 304 and dispatch radio center 302 operating in accordance with the various embodiments. The vehicular two-way radio 304 comprises a controller providing s a two-way radio controller and a navigational controller, a transmitter and a receiver. Vehicular two-way radio 304 can communicate over network 308 with dispatch radio 302, or vehicular two-way radio 304 can listen to dispatch communications between the dispatch radio 302 and two-way radio 306. And further, in group calls two-way radio 304 can listen in when either the dispatcher 302 talks or when another two-way 306 talks.

In accordance with the various embodiments, the controller of vehicular two-way radio 304 controls the navigational alerts to avoid conflict with dispatch voice communication. The navigational alerts comprise voice navigational instructions and navigational tones which are selectively transmitted (or not transmitted) by the vehicular two-way radio 304 and played out over speakers within the radio 304 or vehicle. The controller of two-way radio 304 determines the call's priority based on for example, call codes, caller ID, emergency status, priority scan, and/or length of time of a call versus the time needed for the vehicle to make a required maneuver.

Accordingly, there has been provided an enhanced navigational alert for a vehicular two-way radio operating in a dispatch communication system. The integration and prioritization of navigational alerts with dispatch voice communication in accordance with the various embodiments ensures that navigational alerts do not compromise mission critical voice communications. The combination of dispatch voice and navigational tone provided by the various embodiments avoids a conflict as both can be clearly understood. The combination of navigational tones and navigational voice instructions can be used either when a dispatch call in not active or when the dispatch call is determined not to be sufficiently important. The method and apparatus provided by the various embodiments provides the navigational alerts in a hands free manner thereby facilitating the driver's ability to multi-task with other devices, which is particularly useful in the public safety environment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for selectively rendering vehicular navigational instructions in a vehicle in which a vehicular two-way radio is already engaged in a dispatch voice call, the method comprising:

transmitting or receiving audio, via a transmitter and/or receiver at the vehicular two-way radio, in a dispatch voice call and, while transmitting or receiving the audio in the dispatch voice call:
monitoring, by the vehicular two-way radio, the dispatch voice call and identifying one or more vehicular navigation instruction rendering parameters associated with the dispatch voice call;
determining, as a function of the identified one or more parameters, a level of importance of the dispatch voice call;
identifying a first vehicular navigation maneuver in a set of vehicular navigation maneuvers for providing driving directions to a driver in the vehicle; and
determining that the level of importance of the dispatch voice call meets a predetermined level of importance, and responsively rendering, over a speaker in one of the vehicular two-way radio and the vehicle, a navigational tone associated with the first vehicular navigation maneuver and not rendering a voice navigational instruction associated with the first vehicular navigation maneuver;
determining, by the vehicular two-way radio, that the dispatch voice call has ended;
identifying a second vehicular navigation maneuver in the set of vehicular navigation maneuvers for providing driving directions to the driver in the vehicle; and
subsequently rendering, by the vehicular two-way radio and as a function of the determining that the dispatch voice call has ended, a second voice navigational instruction associated with the second vehicular navigation maneuver over the speaker in one of the vehicular two-way radio and the vehicle.

2. The method of claim 1, wherein the one or more parameters comprise at least one of:
a criticality level of the dispatch voice call;
a calling ID of participants in the dispatch voice call;
a calling code of the dispatch voice call;
an emergency status of the dispatch voice call;
a scan priority of the dispatch voice call; and
whether the dispatch voice call has exceeded a predetermined time duration.

3. The method of claim 2, wherein the one or more parameters include the calling ID of the participants in the dispatch voice call, the method further comprising determining the calling ID of participants in the dispatch voice call by:
   monitoring the dispatch voice call to determine a calling ID of a dispatcher of the dispatch voice call when the dispatch voice call takes place between the vehicular two-way radio and the dispatcher; and
   listening to the dispatch voice call between other two-way radios and determining calling IDs for the other two-way radios.

4. The method of claim 2, wherein the one or more parameters comprise at least one of:
   a calling code of the dispatch voice call;
   a scan priority of the dispatch voice call; and
   whether the dispatch voice call has exceeded a predetermined time duration.

5. The method of claim 1, wherein the one or more parameters include a criticality level of the dispatch voice call, the method further comprising determining that the criticality level of the dispatch voice call is greater than a predetermined level of importance.

6. The method of claim 1, further comprising:
   during the dispatch voice call, automatically and continuously selecting between the voice navigational instruction and the navigational tone for a subsequent vehicular maneuver as a function of the one or more parameters.

7. The method of claim 1, further comprising:
   rendering both the voice navigational instruction and the navigational tone associated with a particular vehicular maneuver in between audio transmissions of the dispatch voice call.

8. The method of claim 1, further comprising:
   postponing rendering any navigational tones while the dispatch voice call is in progress until a time threshold has been reached at which one or more corresponding navigation maneuvers are required to be executed.

9. The method of claim 1, wherein the set of vehicular navigation maneuvers include turn instructions instructing the driver to turn the vehicle and non-turn instructions instructing the driver to continue straight.

10. A vehicular two-way radio for selectively rendering vehicular navigational instructions in a vehicle while already engaged in a dispatch voice call, the radio comprising a controller configured to:
   transmit or receive audio in, a dispatch voice call and while transmitting or receiving the audio, via a transmitter and/or receiver, in the dispatch voice call:
      monitor the dispatch voice call and identify one or more vehicular navigation instruction rendering parameters associated with the dispatch voice call;
      determine, as a function of the identified one or more parameters, a level of importance of the dispatch voice call;
      identify a first vehicular navigation maneuver in a set of vehicular navigation maneuvers for providing driving directions to a driver in the vehicle; and
      determine that the level of importance of the dispatch voice call meets a predetermined level of importance, and responsively render, over a speaker in one of the vehicular two-way radio and the vehicle, a navigational tone associated with the first vehicular navigation maneuver and not render a voice navigational instruction associated with the first vehicular navigation maneuver;
      determine that the dispatch voice call has ended;
      identify a second vehicular navigation maneuver in the set of vehicular navigation maneuvers for providing driving directions to the driver in the vehicle; and
      subsequently render, as a function of the determination that the dispatch voice call has ended, a second voice navigational instruction associated with the second vehicular navigation maneuver over the speaker in one of the vehicular two-way radio and the vehicle.

11. The vehicular two-way radio of claim 10, wherein the parameters associated with dispatch voice calls comprise one or more of:
   a criticality level of the dispatch voice call;
   a calling ID of participants in the dispatch voice call;
   a calling code of the dispatch voice call;
   an emergency status of the dispatch voice call; and
   a scan priority of the dispatch voice call.

12. The vehicular two-way radio of claim 11, wherein the one or more parameters comprise at least one of:
   a calling code of the dispatch voice call;
   a scan priority of the dispatch voice call; and
   whether the dispatch voice call has exceeded a predetermined time duration.

13. The vehicular two-way radio of claim 10, wherein the one or more parameters include a criticality level of the dispatch voice call, the controller further configured to determine that the criticality level of the dispatch voice call is greater than a predetermined level of importance.

14. The vehicular two-way radio of claim 10, the controller further configured to, during the dispatch voice call, automatically and continuously select between the voice navigational instruction and the navigational tone for a subsequent vehicular maneuver as a function of the one or more parameters.

15. The vehicular two-way radio of claim 10, the controller further configured to render both the voice navigational instruction and the navigational tone associated with a particular vehicular maneuver in between audio transmissions of the dispatch voice call.

16. The vehicular two-way radio of claim 10, the controller further configured to postpone rendering any navigational tones while the dispatch voice call is in progress until a time threshold has been reached at which one or more corresponding navigation maneuvers are required to be executed.

17. The vehicular two-way radio of claim 10, wherein the set of vehicular navigation maneuvers include turn instructions instructing the driver to turn the vehicle and non-turn instructions instructing the driver to continue straight.

* * * * *